(12) United States Patent
Eldar et al.

(10) Patent No.: US 8,132,018 B2
(45) Date of Patent: Mar. 6, 2012

(54) TECHNIQUES FOR PASSWORD ATTACK MITIGATION

(75) Inventors: Avigdor Eldar, Jerusalem (IL); Itamar Sharoni, Tel Aviv (IL); Tsippy Mendelson, Jerusalem (IL); Uri Blumenthal, Fair Lawn, NJ (US)

(73) Assignee: Intel Corporation, Santa Clara, CA (US)

( * ) Notice: Subject to any disclaimer, the term of this patent is extended or adjusted under 35 U.S.C. 154(b) by 1374 days.

(21) Appl. No.: 11/174,126

(22) Filed: Jun. 30, 2005

(65) Prior Publication Data

US 2007/0005985 A1  Jan. 4, 2007

(51) Int. Cl.
*G06F 21/00* (2006.01)

(52) U.S. Cl. ........ 713/183; 713/184; 713/182; 713/178; 713/179; 713/185; 713/186; 705/18; 705/67; 705/72; 726/2; 726/4; 726/17; 726/18; 726/21; 726/27; 726/28; 726/29; 380/229; 380/232

(58) Field of Classification Search .................. 713/183, 713/178, 179, 184, 185, 186; 726/17, 18, 726/19, 2, 4, 27, 21, 28, 29; 705/18, 67, 705/72; 380/229, 232
See application file for complete search history.

(56) References Cited

U.S. PATENT DOCUMENTS

| | | | |
|---|---|---|---|
| 5,732,212 A * | 3/1998 | Perholtz et al. ............... 709/224 |
| 5,919,257 A * | 7/1999 | Trostle ............................ 726/22 |
| 6,314,520 B1 * | 11/2001 | Schell et al. ..................... 726/13 |
| 6,477,648 B1 * | 11/2002 | Schell et al. ..................... 726/22 |
| 6,505,164 B1 * | 1/2003 | Brunsting et al. ................ 705/1 |
| 6,587,032 B2 * | 7/2003 | Armingaud .................. 340/5.31 |
| 6,587,867 B1 * | 7/2003 | Miller et al. ..................... 709/200 |
| 6,643,626 B1 * | 11/2003 | Perri de Resende ........... 705/64 |
| 6,968,385 B1 * | 11/2005 | Gilbert .......................... 709/229 |
| 7,058,817 B1 * | 6/2006 | Ellmore ........................ 713/183 |
| 7,069,055 B1 * | 6/2006 | Lee ............................... 455/566 |
| 7,165,267 B1 * | 1/2007 | Utsumi et al. .................... 726/2 |
| 7,349,867 B2 * | 3/2008 | Rollins et al. .................. 705/26 |
| 7,373,663 B2 * | 5/2008 | Robert ............................ 726/22 |
| 7,383,570 B2 * | 6/2008 | Pinkas et al. ..................... 726/2 |
| 7,421,733 B2 * | 9/2008 | Glassman et al. ................ 726/6 |
| 7,454,794 B1 * | 11/2008 | Hibberd ......................... 726/27 |
| 7,480,932 B2 * | 1/2009 | Nakao .............................. 726/2 |
| 2002/0091850 A1 * | 7/2002 | Perholtz et al. ............... 709/231 |
| 2002/0114272 A1 * | 8/2002 | Stewart .......................... 370/218 |
| 2002/0116509 A1 * | 8/2002 | DeLaHuerga ............... 709/229 |
| 2002/0174009 A1 * | 11/2002 | Myers et al. ..................... 705/14 |
| 2003/0043984 A1 * | 3/2003 | Lauzon ..................... 379/144.01 |
| 2003/0057272 A1 * | 3/2003 | Bidan et al. .................. 235/380 |
| 2006/0112436 A1 * | 5/2006 | Modave ......................... 726/34 |

* cited by examiner

*Primary Examiner* — April Shan
(74) *Attorney, Agent, or Firm* — Kacvinsky Daisak, PLLC (57) ABSTRACT

Apparatus, system, and method having a first counter to record a number of invalid authentication requests, a first timer to set a first time period based on a value of the first counter, and an authentication module associated with the first counter and the first timer to receive an initial authentication request that includes a username and when said username is invalid, the module is to invalidate any subsequent authentication requests under the username during the first time period regardless of whether the subsequent requests includes a valid username. The system further includes a communication medium. The method includes receiving an authentication request with new information in a first session, validating the new information, and caching the validated new information in the first session.

10 Claims, 5 Drawing Sheets

TECHNIQUES FOR PASSWORD ATTACK MITIGATION

BACKGROUND

In a computer network environment a computer connected to the network must protect itself against attacks from remote entities (e.g., computers) connected to the same network, e.g., Local Area Network (LAN) as well as an Internet network. An attacker from a remote computer may initiate an attack on a target computer by attacking a user password. Although passwords based on dictionaries are the most common authentication method for a user to access a computer or login to a remote computer, they are inherently insecure. Such dictionary based passwords are insecure because they are usually generated by humans from a relatively small domain and are easy to guess at. Computer generated passwords may be slightly more secure, but are not optimal because they are not user friendly and may be difficult to remember. An attacker may attack passwords by eavesdropping on a network channel and learning confidential information (e.g., username/password) from the output of the computer system. In addition to dictionary attacks, a networked computer also may be vulnerable to Denial of Service (DoS) attacks, username/password authentication, and HTTP authentication attacks, which are described below.

A networked computer may be vulnerable to online dictionary username/password attacks. In online dictionary attacks, an attacker makes an initial guess at a username/password pair and tries to systematically and repeatedly login using revised versions of username/password pairs based on the initial guess. Dictionary attacks are usually carried out in a specially crafted sequence of username/password pair retries. Thus, if an attacker continuously sends username/password authentication requests to a target computer, the attacker eventually may identify which requests were validated by the target computer and break into the user accounts.

A networked computer also may be vulnerable to another form of attack referred to as a Denial of Service (DoS) attack. In a DoS attack, the attacker attempts to deliberately lockout a user account by repeatedly trying to login into the user account using random passwords. In one form, a DoS attack may be in the form of an SYN message TCP flooding attack. A SYN (synchronize) message is a type of packet used by the Transmission Control Protocol (TCP) when initiating a new connection to synchronize the sequence numbers on two connecting computers. This type of SYN TCP attack occurs when one system (called the client) attempts to establish a TCP connection to another system providing a service (the server), the client and server exchange a set sequence of messages. The client system begins by sending a SYN message to the server. The server then acknowledges the SYN message by sending SYN-ACK (SYN-acknowledge) message to the client. The client then finishes establishing the connection by responding with an ACK (acknowledge) message. The connection between the client and the server is then open, and the service-specific data can be exchanged between the client and the server. The potential for abuse arises at the point where the server system has sent an acknowledgment (SYN-ACK) back to client but has not yet received the ACK message. This is typically referred to as a half-open connection or partially open connection. The server has built in its system memory a data structure describing all pending connections. This data structure is of finite size, and it can be made to overflow by intentionally creating too many partially-open connections.

Creating half-open connections may be accomplished with Internet Protocol (IP) spoofing. The attacking system sends SYN messages to the victim server system. Although these SYN messages appear to be legitimate, in fact they reference a client system that is unable to respond to the SYN-ACK messages. This means that the final ACK message will never be sent to the victim server system. The half-open connections data structure on the victim server system will eventually fill and the system will be unable to accept any new incoming connections until the table is emptied. Normally there is a timeout associated with a pending connection, so the half-open connections will eventually expire and the victim server system will recover. However, the attacking system can simply continue sending IP-spoofed packets requesting new connections faster than the victim system can terminate the pending connections. Typically, the victim of such an attack will have difficulty in accepting any new incoming network connection. In such cases, the attack neither affects existing incoming connections nor the ability to originate outgoing network connections. However, in some cases, the system may exhaust memory, crash, or be rendered otherwise inoperative. An attacker may be able to impose a DoS attack on a target computer if the attacker knows any one of the configured usernames in the target computer being attacked. Such DoS attacks may not necessarily be confined to the target computer. Furthermore, any current legitimate sessions established prior to or during a DoS attack may be disconnected as a result.

A conventional countermeasure to these popular dictionary attacks is to lockout a user account. Locking a user account, however, is costly, as it imposes a DoS attack on the user. For example, entities that conduct a majority of their business online, such as online auctions and service related organizations, among others, are likely to experience real financial losses if user accounts are locked out due to dictionary or DoS attacks. Thus, there is a need to secure password based authentication systems against online dictionary, DoS, and other such password attacks.

DETAILED DESCRIPTION

Figure 1:
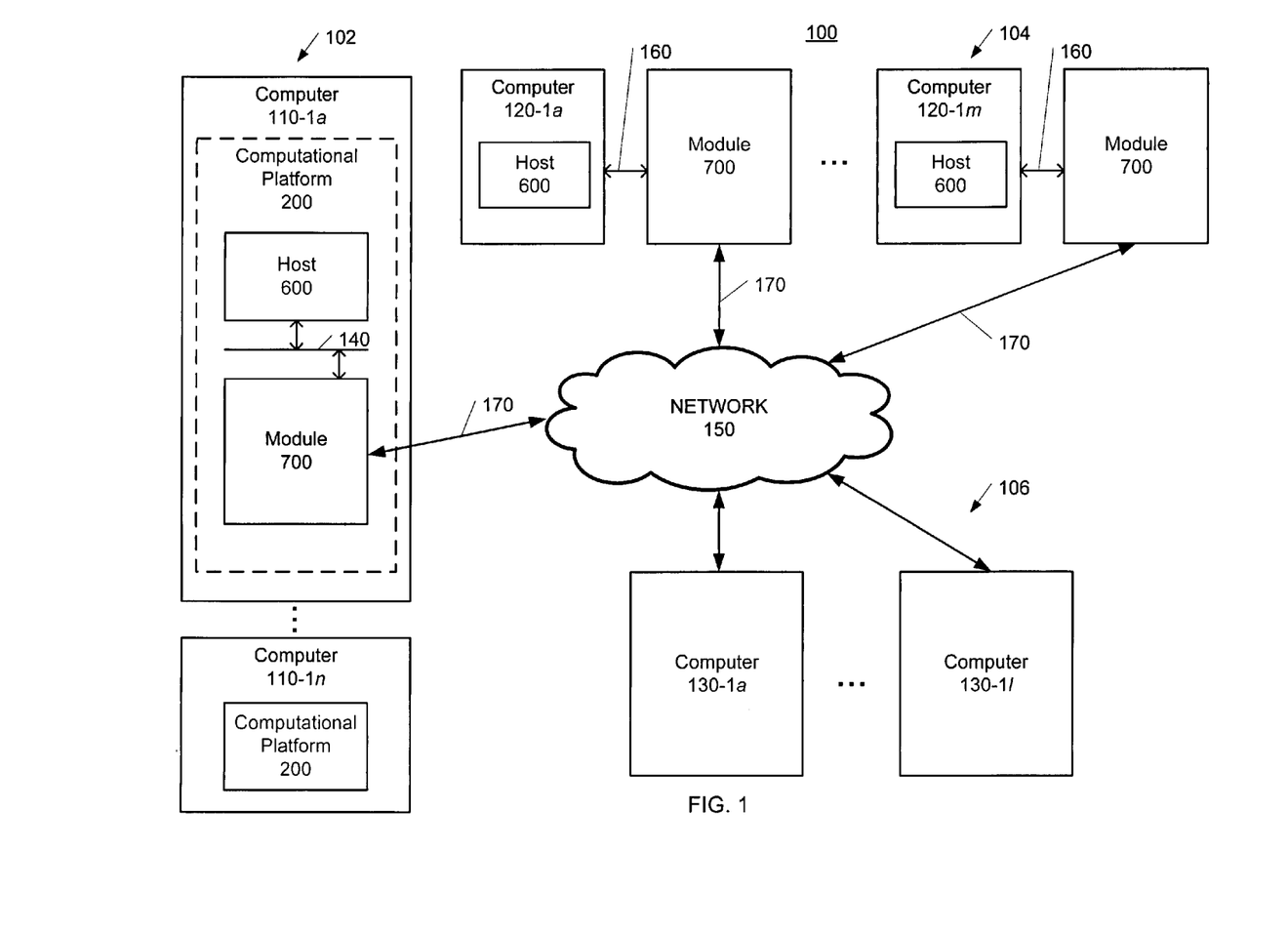
FIG. 1 illustrates one embodiment of a system 100

FIG. 1 illustrates one embodiment of a system 100. FIG. 1 illustrates a block diagram of a system 100. System 100 may comprise a communication system having multiple nodes. A node generally may comprise any physical or logical entity for communicating information in system 100 and may be implemented as hardware, software, or any combination thereof, as desired for a given set of design parameters or performance constraints. Although FIG. 1 may show a limited number of nodes by way of example, it can be appreciated that additional or fewer nodes may be employed in a given implementation. The embodiments are not limited in this context.

A node may comprise any physical or logical entity having a unique address in system 100. The unique address may comprise, for example, a network address such as an IP address, a device address such as a Medium Access Control (MAC) address, and so forth. The embodiments are not limited in this context.

The nodes of system 100 may comprise or form part of a network 150, such as a LAN, a Metropolitan Area Network (MAN), a Wide Area Network (WAN), a Wireless LAN (WLAN), an Internet network, a World Wide Web network, a telephony network (e.g., analog, digital, wired, wireless, Public Switched Telephone Network (PSTN), Integrated Services Digital Network (ISDN) or Digital Subscriber Line (xDSL)), a radio network, a television network, a cable network, a satellite network, and/or any other wired or wireless communications network configured to carry data. Network 150 may include one or more elements, such as, for example, intermediate nodes, proxy servers, firewalls, routers, switches, hubs, adapters, sockets, and wired or wireless data pathways, configured to direct and/or deliver data to other networks. The embodiments are not limited in this context.

The nodes of system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks. The embodiments are not limited in this context.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may comprise a packet network communicating information in accordance with one or more packet protocols, such as one or more Internet protocols, including the Transport Control Protocol (TCP) and IP, TCP/IP, X.25, Hypertext Transfer Protocol (HTTP), User Datagram Protocol (UDP), and DHCP protocol. In another example, system 100 may communicate packets using a medium access control protocol such as Carrier-Sense Multiple Access with Collision Detection (CSMA/CD), as defined by one or more IEEE 802 Ethernet standards. In yet another example, system 100 may communicate packets in accordance with one or more Asynchronous Transfer Mode (ATM) protocols, Frame Relay, Systems Network Architecture (SNA), and so forth. The embodiments are not limited in this context.

In various embodiments, system 100 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, Digital Signal Processors (DSPs), Programmable Logic Devices (PLDs), Application Specific Integrated Circuits (ASICs), circuits, registers), software components (e.g., programs, subroutines, logic) and/or combination thereof. The embodiments are not limited in this context.

In various embodiments, system 100 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may comprise, or may be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based Integrated Circuit (IC) processes such as complementary metal oxide semiconductor (CMOS), bipolar, and bipolar CMOS (BiCMOS) processes, for example. The embodiments are not limited in this context.

In one embodiment, the modules, sub-modules, components or elements of system 100 may comprise, for example, a network management module to manage computational platform deployment and maintenance in an Information Technology (IT) organization or environment. In one embodiment, a network management module may be deployed by embedding a network controller module in hardware (or firmware) associated with a computational platform to communicate with remote management entities by sharing a platform LAN controller with a host computer's operating system (OS). In one embodiment, a network management module may comprise its own network stack and manageability service functionality running in parallel and independently of the host computer OS. In one embodiment, the network management module may provide Out Of Band (OOB) system management functionality to manage platforms remotely regardless of the power on/off state or OS state of the host computer, for example. In one embodiment, a network management module may be configured to provide remote troubleshooting and recovery functionality to significantly reduce desk-side visits and increase the efficiency of IT technical staff, for example. In one embodiment, a network management module may be configured to provide proactive alerting functionality to decrease system downtime and minimize time-to-repair, for example. In one embodiment, a network management module may be configured to provide remote hardware and software tracking to minimize time-consuming manual inventory tracking and human error, reducing asset accounting costs and increasing tracking accuracy, for example. In one embodiment, a network management module may be configured to provide non-volatile storage (e.g., non-volatile memory (NVM)) to survive power outages and perform system rebuilds, for example. In one embodiment, a network management module may be configured to provide tamper-resistant agents to prevent users from removing critical inventory, remote-control or virus-protection agents, for example. In one embodiment, a network management module may be implemented in accordance with Intel® Active Management Technology (Intel® AMT), for example. The embodiments are not limited in this context.

Some computer applications may comprise two or more computer systems each comprising a network management module embedded within a host computer computational platform that share a network 150 interface. In one embodiment, the two or more computer systems may share a single IP address. The two or more computer systems comprising a network management module may work together or separately, so that when one computer is shut down, hanged, or in standby, the other one is still functional and may be accessed over network 150 and may operate on behalf of the inoperable computer, for example. The embodiments are not limited in this context.

In one embodiment, a network management module may comprise a Network Interface Chip (NIC) that serves a host OS with its own OS driver that includes an embedded manageability module to operate and communicate over network 150 (e.g., LAN, Internet) while the host computer system is operational as well as when the host computer system and its OS are inoperable, disconnected, shutdown, hanged or in standby mode. In one embodiment, an embedded manageability module may be accessed regardless of the state of the host OS, so that it may be accessed even if the host OS is incapable of extending a DHCP lease, for reasons discussed above. In one embodiment a network management module may comprise an authentication module embedded therewith. In one embodiment, the authentication module may be configured to provide protection against authentication attacks on a target computer by a remote computer, such as for example, DoS attacks, username/password authentication, HTTP authentication attacks, online dictionary password, and other similar attacks. In one embodiment, the authentication module may be configured for embedded devices with few available resources that may require username/password authentication. In one embodiment, the authentication module may be configured to use blackout periods to maintain the computer system open and responsive to incoming authentication requests during an attack. In one embodiment, a "blackout period" may refer to a period in which the computer system is open and responsive to incoming authentication requests during an attack, but "blindly" fails all authentications. The term "blindly" is used to indicate that during a blackout period, the system fails valid and invalid authentication requests carried out on behalf of a given user, including requests carrying correct password information. In one embodiment, use of blackout periods may eliminate the possibility to simultaneously carry out both a DoS attack and an online password dictionary attack, for example. Accordingly, in one embodiment, during a blackout period, the authentication module temporarily (e.g., for the duration of the "blackout" period) blindly invalidates all authentication requests from a remote computer to a target computer carried out on behalf of a given user, including legitimate requests carrying correct password information. The embodiments are not limited in this context.

In one embodiment, the authentication module may be configured to act as a network server to allow remote administrators to perform configuration tasks and other related operations. Accessing the authentication module may require a remote entity to authenticate itself via the authentication module by providing correct username/password information, for example. The authentication module then checks the authenticity of the request by comparing the information provided by the remote entity with that stored confidentially within a persistent data store, (e.g., Flash Memory) associated with the authentication module. The embodiments are not limited in this context.

In one embodiment, the authentication module may be operable to protect itself from online dictionary attacks aimed at cracking username and password information used to manage the authentication module, for example. Specifically, in one embodiment, the functionality of the authentication module may be tailored to protect devices that have memory and processing resources constraints, such as the Intel® AMT, for example, and to reduce any potential DoS attack that usually accompany a dictionary attack mitigation mechanism. The embodiments are not limited in this context.

These concepts may be illustrated with reference to FIG. 1, for example. Accordingly, as shown in FIG. 1, system 100 may be realized as network 150 comprising nodes 102, 104, and 106. In various embodiments, nodes 102 and 104 may be arranged to operate as computers 110-1a-n and 120-1a-m (where n and m may be any positive integer), and one or more remote entity computers 130-1a-l (where l may be any positive integer), connected via network 150. The embodiments are not limited in this context.

In one embodiment, nodes 102, 104, and 106 may be arranged to operate in accordance with one or more DHCP protocols, as well as MAC protocols, such as from the IEEE 802.3 series of Ethernet protocols, for example. Node 106 may be implemented as a high bandwidth switch, such as a Fast Ethernet switch operating at 100 megabits per second (Mbps), a Gigabit Ethernet switch operating at 1000 Mbps or 10 Gigabits per second (Gbps), a router configured as a DHCP server, and so forth. The embodiments are not limited in this context.

In one embodiment, system 100 may comprise two or more computers 110-1a-n and 120-1a-m and one or more remote entity computers 130-1a-l, which may be configured to communicate over network 150. Computers 110-1a-n and 120-1a-m may comprise a host computer 600 having a host operating system (OS) coupled to a network management module, such as, for example, a module 700 (e.g., a LAN controller, a Network Interface Chip (NIC), manageability module, authentication module, and the like) comprising one or more embedded applications, for example. Host computer 600 and module 700 may be coupled over bus 140 or interface 160 and may be configured to share a single IP address. In one embodiment, module 700 may comprise Intel® AMT functionality, for example. In one embodiment, computers 110-1a-n and 120-1a-m may communicate with network 150 via connection 170, for example. In one embodiment, host computer 600 and module 700 may be provided within the same computational platform 200 (e.g., a single computer system), for example. In one embodiment, as shown with respect to computers 120-1a-l, for example, host computer 600 and module 700 may be provided as separate modules located on different computational platforms or separate remote computer systems, for example. The embodiments are not limited in this context.

In various implementations, host computer 600 and/or module 700 may be arranged to perform various processing operations. Processing operations may generally refer to one or more operations, such as generating, managing, communicating, sending, receiving, storing forwarding, accessing, reading, writing, manipulating, encoding, decoding, compressing, decompressing, encrypting, filtering, streaming or other processing of information. The embodiments are not limited in this context.

In one embodiment, system 100 may be arranged such that nodes 102, 104, and 106 may be arranged as any one of computers 110-1a-n and 120-1a-m and may be configured to share an interface 170 to network 150 (e.g. a LAN interface). In one embodiment, any two or more computers 110-1a-n and 120-1*a-m* may share a single IP address because of limited allocation of IP addresses in network 150 (e.g., IPv4) or because any two or more computers 110-1*a-n* and 120-1*a-m* may likely be accessed using a single IP address or using the same name for network 150 as though it was a single system, for example. The embodiments are not limited in this context.

Host 600 and module 700 in a computational platform 200 associated with any one of corresponding computers 110-1*a-n* may work together or separately, so that when a corresponding computer 110-1*a-n* (e.g., host 600) goes into shutdown mode, is hanged or goes into standby mode, another computer (e.g., module 700) may be functional and may be accessed over network 150, for example. This functionality may be provided in a network management module portion of module 700, for example. In one embodiment, host computer 600 and module 700 of a computational platform 200 associated with any one single computer 110-1*a-n*, also may work together or separately such that when host computer 600 goes into shutdown mode, is hanged or goes into standby mode, then module 700 may still be functional and may be accessed by remote entity computers 130-1*a-l* to resume intended operations, for example.

In one embodiment, for example, module 700 may serve a host OS with its OS driver embedded within an authentication module embedded within module 700, for example, that operates and communicates with network 150 while host computer 600 is running as well as when host computer 600 and its OS go into shutdown mode, are hanged or become standby. Thus, an embedded authentication module may be accessed regardless of the state of host computer 600 or the state of its OS so that it may be accessed even if host computer 600 and its OS are incapable of responding to network requests, including for example, authentication requests. The embodiments are not limited in this context.

Examples of an OS may comprise, for example, a Cisco Internetwork Operating System (IOS), Juniper JUNOS, Microsoft® Windows® OS (e.g., 95, 98, NT, ME, 2000, XP, CE, Longhorn), Apple Macintosh OS, IBM OS, Linux, Unix, Solaris, 3Com Palm OS, and the like. The embodiments are not limited in this context.

In various embodiments, host computer 600 and module 700 may communicate with remote entity computers 130-1*a-l* in accordance with one or more protocols and/or specifications. For example, in various embodiments, IP addressing sharing may be performed in accordance with DHCP protocol. The embodiments are not limited in this context.

Host computer 600 OS and module 700 may comprise embedded applications implemented as firmware, software, hardware or any combination thereof, for example. Module 700 may comprise various executable modules such as software, programs, data, drivers, application program interfaces (APIs), and so forth. The firmware may be stored in NVM, such as in bit-masked read-only memory (ROM) or flash memory. In various implementations, storing the firmware in ROM may preserve flash memory. The NVM may comprise other types of memory including, for example, programmable ROM (PROM), erasable programmable ROM (EPROM), electrically erasable programmable ROM (EEPROM), or battery backed random-access memory (RAM) such as dynamic RAM (DRAM), Double-Data-Rate DRAM (DDRAM), and/or synchronous DRAM (SDRAM). The embodiments are not limited in this context.

Figure 2:
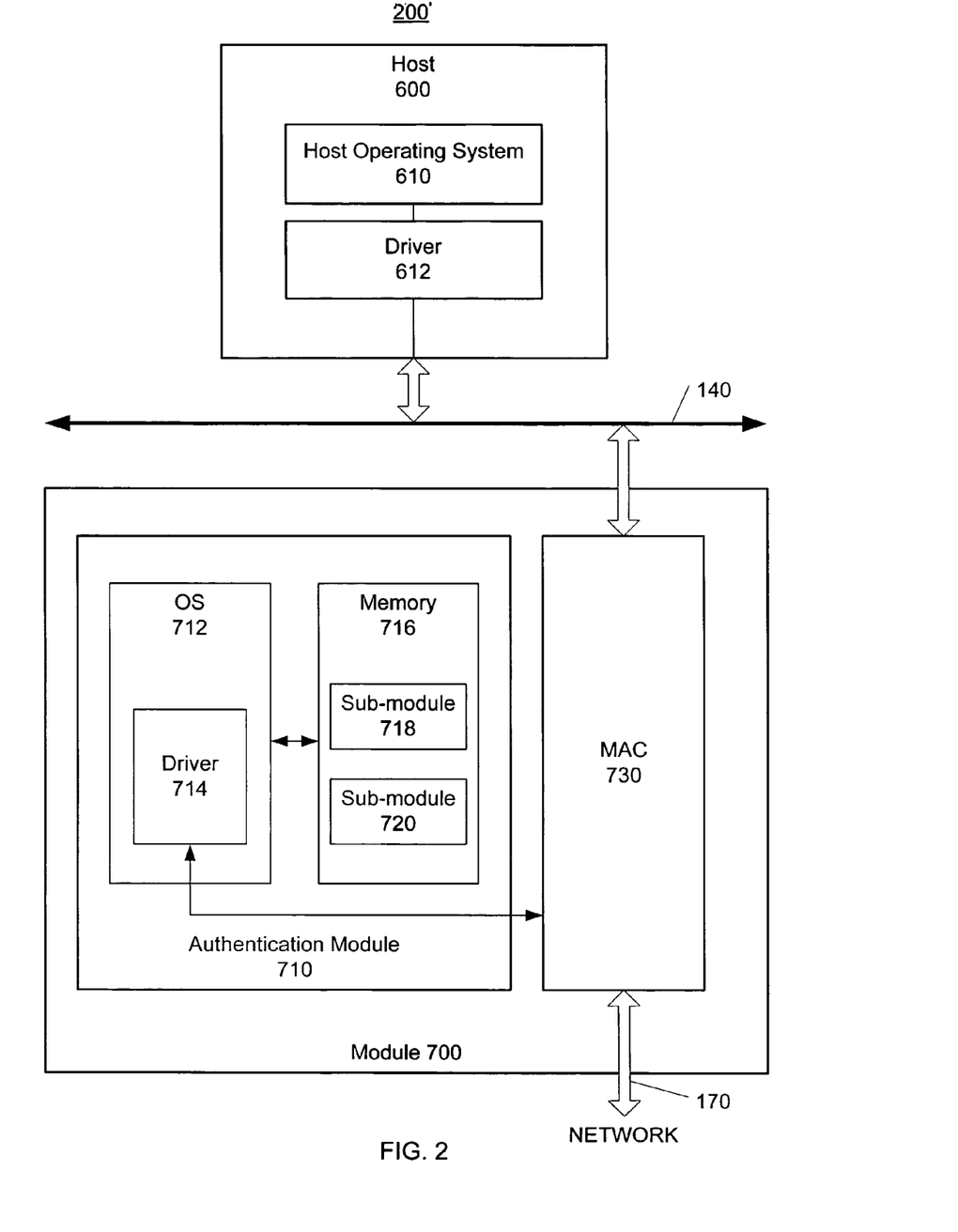
FIG. 2 illustrates one embodiment of a block diagram of computational platform 200.

FIG. 2 illustrates one embodiment of a block diagram of a computational platform 200. Computational platform 200 may represent a module of node 102 forming a portion of computers 110-1*a-n*, for example, as described with reference to FIG. 1. As shown in FIG. 2, computational platform 200 may comprise host computer 600 coupled to module 700 via computer bus 140, for example. In one embodiment, computer bus 140 may be a Peripheral Component Interconnect (PCI) bus, for example. Host computer 600 may comprise host OS 610 and a host network driver 612. Module 700 may comprise multiple elements, such as, for example, authentication module 710 and Medium Access Controller 730 (MAC). In one embodiment, module 700 may comprise a network management module comprising Intel® AMT. Authentication module 710 may be configured to operate in accordance with the network management module to execute an attack mitigation mechanism, for example. In one embodiment, authentication module 710 may comprise multiple elements, such as, for example, operating system 712 (OS), network driver 714, and memory 716 (e.g., embedded processor memory, Flash memory, NVM, and the like). Some elements may be implemented using, for example, one or more circuits, components, registers, processors, software subroutines, firmware, programmable logic, or any combination thereof. Although FIG. 2 shows a limited number of elements, it can be appreciated that additional or fewer elements may be used in computational platform 200 as desired for a given embodiment. The embodiments are not limited in this context.

In one embodiment, module 700 may share an IP address with its host computer 600, for example. In one embodiment, module 700 may be self-configured, for example. In one embodiment, module 700 may be located in the same computational platform as host computer 600 in computers 110-1*a-n*, as shown in FIG. 1. Although in one embodiment, authentication module 710 may be embedded in module 700, for example, in other embodiments authentication module 710 may be located separately or remotely from module 700. In one embodiment, authentication module 710 may be configured to be aware of network authentication requests or responses to host computer 600 from remote entity computers 130-1*a-l* via network 150. In one embodiment, authentication module 710 may be configured to be aware of the state of host computer 600 and the state of host OS 310. For example, authentication module 710 may be configured to be aware of whether host computer 600 and/or host OS 310 is in shutdown mode, is hanged or is in standby mode. The embodiments are not limited in this context.

In general operation, computational platform 200 may operate such that module 700 shares the same IP address with host computer 600, such as, for example a DHCP IP address allocated by a remote entity computer 130-1*a-l* configured as a DHCP server, for example. Module 700 may comprise, for example, an integrated authentication module 710, for example, to access the network controller's 700 MAC 730 to transmit and receive manageability commands to and from network 150. In one embodiment, authentication module 710 may comprise its own OS 712, and network driver 714, for example. In one embodiment, authentication module 710 may be self-configured and may share an IP address with host computer 600. The embodiments are not limited in this context.

In one embodiment, authentication module 710 may be configured to execute an attack mitigation mechanism, which maintains a central database with all authentication information for module 700, various network 150 protocols supported by Intel® AMT, such as HyperText Markup Language (HTML) page server, Simple Object Access Protocol (SOAP) Remote Procedure Call (RPC) provider and redirection engine, for example. Calls to authentication module 710 may be made to validate information for newly established network 150 sessions. In one embodiment, the mitigation mechanism executed by authentication manager 710 may comprise a system under attack sub-module 718 and a user attack record sub-module 720, for example. The embodiments are limited in this context.

In one embodiment, system under attack sub-module 718 of authentication module 710 may define one or more system state variables, which may be represented as "SystemUnderAttack," to determine whether a computer 110-1$a$-$n$ comprising authentication module 710 in its corresponding computational platform 200 node is currently under attack. In one embodiment, authentication module 710 may be configured to maintain state information in any one of a corresponding computer 110-1$a$ in which it may be located in, but not on the other computers 110-1$b$-$m$, for example. Thus, for a given computer 110-1$a$, authentication module 710 maintains state information only for that computer 110-1$a$ in which it may be located, but not on the other computers 110-1$b$-$m$ in which it is not located. In one embodiment, authentication module 710 may determine that the system is under attack if a number of invalid authentication requests exceed a predefined threshold (e.g., Threshold=10) is in effect. In one embodiment, authentication module 710 may declare that the system is not under attack following a lapse of a predetermined period of time (e.g., 1 hour) with no occurrences of invalid authentication requests, for example. Based on the state of the "SystemUnderAttack" variable, in one embodiment, authentication module 710 determines appropriate handling of incoming invalid authentication requests. While the system is determined to be under attack by authentication module 710, such requests may be considered hostile and treated accordingly. When the system is determined not to be under attack by authentication module 710, any invalid authentication requests may be treated as innocent mistakes carried out by legitimate remote entities. Logic flow 400 (FIG. 4) below provides additional information with respect to the operation of system under attack 718 sub-module of authentication module 710.

In one embodiment, user under attack sub-module 720 of authentication module 710 may define a per username structure, which may be represented as "UserAttackRecord," comprising a "blackout" counter to track the number of invalid authentication requests carrying the given username information. Based on the "blackout" counter the authentication module 710 temporarily (e.g., for a "blackout" period) blindly invalidates all authentication requests carried on behalf of the given user, including legitimate requests carrying correct password information. Positive "blackout" periods may be in effect following a minimal threshold of invalid user requests. "Blackout" periods may grow in exponential order, as the "blackout" counter increments to defy a concurrent attack on multiple devices carrying identical username/password information. In one embodiment, the "blackout" period may be maxed at a predefined value (e.g., 5 minutes) to limit any DoS attack period that an attacker may impose on legitimate applications. In one embodiment, all requests carrying invalid "username" information may be handled in the context of an "Invalid User" account used to track such requests. Therefore, in one embodiment, those requests may not cause "blackouts" to any of the configured users, for example. In addition an "Invalid User" account allows the system to maintain the confidentiality of any configured users in the system. Therefore, an attacker cannot identify whether random information contains valid or invalid information by testing the output from the authentication module 710 over network 150. The embodiments are not limited in this context.

Operations for the above system and subsystem may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software or firmware element executed by a processor, or any combination thereof. The embodiments are not limited in this context.

Figure 3:
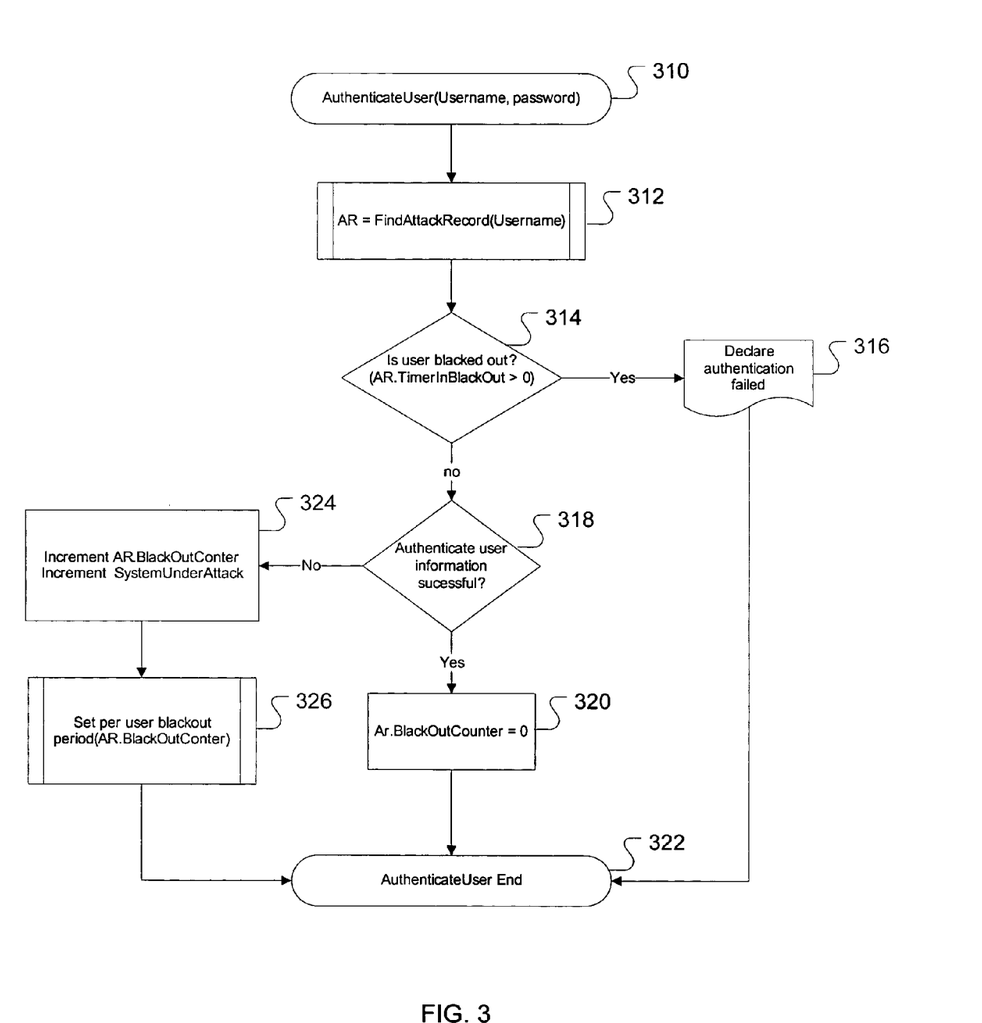
FIG. 3 illustrates one embodiment of a logic flow 300.

FIG. 3 illustrates one embodiment of a logic flow 300. Logic flow 300 may be representative of the operations executed by one or more systems described herein, such as module 700 or authentication module 710, for example. Logic flow 300 illustrates one embodiment of a process in which authentication module 710 within a computer 110-1$a$-$n$, 120-1$a$-$m$ for example, may process information, such as, for example, "user authentication" requests from remote entity computers 130-1$a$-$l$, for example. Although logic flow 300 may be executed by a variety of computing devices, for illustration purposes, logic flow 300 is described with respect to execution by authentication module 710, although the embodiments are not limited in this context.

Figure 5:
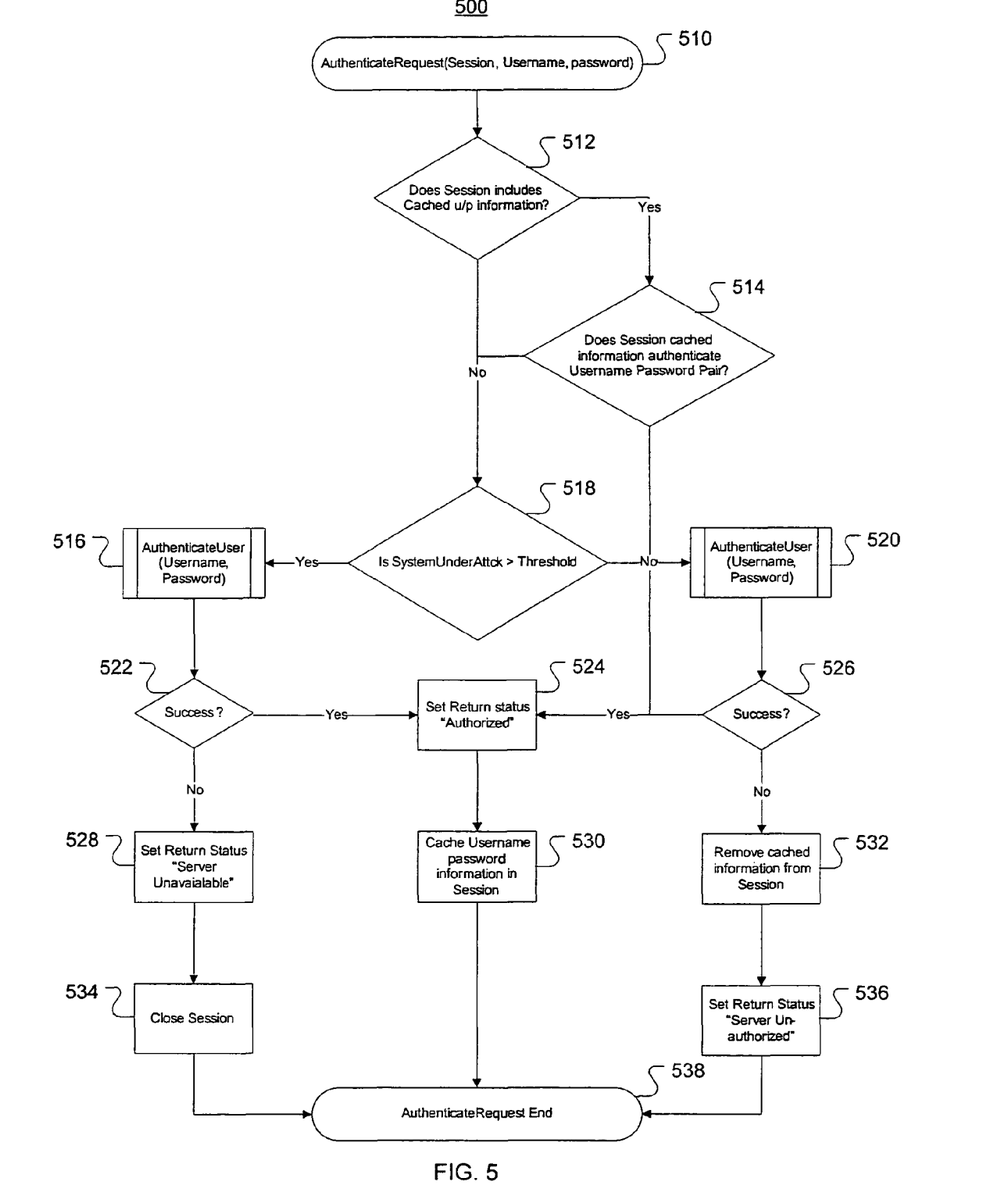
FIG. 5 illustrates one embodiment of a logic flow 500.

Accordingly, in one embodiment, authentication module 710 may execute logic flow 300 to implement one embodiment of an attack mitigation mechanism, for example. Three variables initially may be allocated to define a "UserAttackRecord," such as "Username," "BlackOutCounter," and "TimeInBlackout," for example. The "username" authentication process may begin when authentication module 710 receives (310) information, such as, for example, a "username/password" pair. The "username" authentication process described in logic flow 300 may be invoked from other concurrent programs such as a "request" authentication process described in logic flow 500 (FIG. 5). When the "username" authentication process is invoked (e.g., blocks 516, 520 of logic flow 500 in FIG. 5), a function "FindAttackRecord" is invoked (312) and the "username" received in block 310 to be authenticated is passed as the function argument to define, for example, an authentication record (AR) object. The function FindAttackRecord finds the attack record for the particular "username" to be validated and tries to determine whether an incorrect password has been entered under that "username." Authentication module 710 then determines (314) whether the user is currently blacked out. As previously discussed, during a "blackout" period authentication module 710 blindly invalidates all authentication requests carried out on behalf of the given user, including for example, legitimate requests carrying correct "username/password" information. In other words, during the "blackout" period authentication module 710 will ignore legitimate and illegitimate authentication requests from the user.

If the user is blacked out (e.g., AR.TimerInBlackOut>0), then authentication module 710 logic flow proceeds along "yes" branch and declares (316) a failed authentication and ends (322) the authenticate user process. If, at decision block 314, the user is not blacked out, authentication module 710 logic flow proceeds along "no" branch and determines (318) whether the "username" was successfully authenticated. If the "username" was successfully authenticated, authentication module 710 logic flow proceeds along "yes" branch, resets (320) the AR.BlackOutCounter to 0, and ends the "username" authentication process. If at block 318 the "username" was not successfully authenticated, authentication module 710 increments (324) two counters, the AR.Black- OutCounter within the authentication record for the particular "username" and a system wide independent SystemUnderAttack counter, for example.

When SystemUnderAttack counter reaches a predetermined value, a SystemUnderAttack logic flow is executed after a predetermined number of invalid attacks are made. For example, in one embodiment, authentication module 710 may determine that the system is under attack if a number of invalid authentication requests tracked by SystemUnderAttack counter exceeds a predefined threshold (e.g., Threshold=10). Authentication module 710 then sets (326) a per user "blackout" period equal to the value in AR.BlackOutCounter and ends (322) the user authentication process. The per user "blackout" period may vary according to the number of authentication attempts made by a user. For example, in one embodiment, authentication module 710 may allow a user to enter a few invalid "username" authentication requests, but then the per user "blackout" period is incrementally increased up to a predetermined maximum "blackout" period. In one embodiment, the maximum "blackout" period may be set at a predefined value (e.g., 5 minutes) to limit a DoS attack period imposed by an attacker on legitimate applications, for example. The embodiments are not limited in this context.

Figure 4:
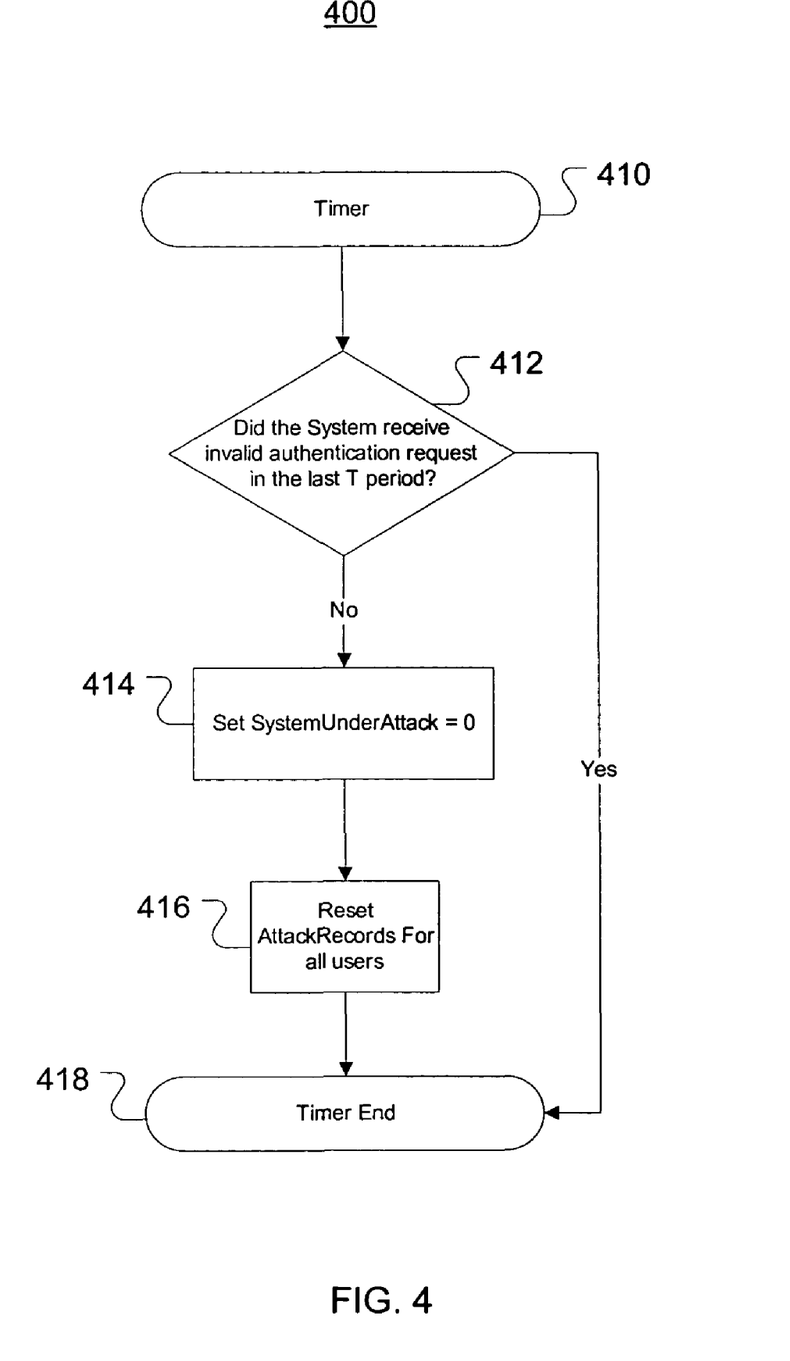
FIG. 4 illustrates one embodiment of a logic flow 400.

FIG. 4 illustrates one embodiment of a logic flow 400. Logic flow 400 may be representative of the operations executed by one or more systems described herein, such as module 700, authentication module 710 or host 600, for example. Logic flow 400 illustrates one embodiment of a period timer process that may be used by authentication module 710 within a computer 110-1a-n, 120-1a-m for example, when processing authentication requests from remote entity computers 130-1a-l, for example. Although logic flow 400 may be executed by a variety of computing devices, for illustration purposes, logic flow 400 is described with respect to execution by sub-module 718, although the embodiments are not limited in this context.

Accordingly, in one embodiment, sub-module 718 may execute logic flow 400 to determine whether any invalid authentication requests have been received within a predetermined period "T." The period timer process starts (410) when the SystemUnderAttack register in incremented in block 324 of logic flow 300. Sub-module 718 determines (412) whether the system received an invalid authentication request in the last predetermined period "T." Period "T" may be preconfigured to an arbitrary value corresponding to a "quiet" period in which no invalid authentication requests have been sent to authentication module 710 before it determines that the attack is gone. In one embodiment, for example, after predetermine time period "T" lapse, authentication module 710 may declare that the system is no longer under attack and a normal authentication process may resume. In one embodiment, for example, predetermined time period "T" may be 1 hour with no occurrences of invalid authentication requests, for example. If an invalid authentication request is received within the predetermined period "T," however, sub-module 718 logic flow proceeds along "yes" branch and ends (418) the timer function without resetting the SystemUnderAttack counter and without resetting the AttackRecords for all users. The timer keeps running until it is reset or period "T" lapses. If an invalid authentication request is not received within the last predetermined period "T," sub-module 718 logic flow proceeds along "no" branch and sets (414) SystemUnderAttack counter to 0. Thus, the SystemUnderAttack counter in block 324 of logic flow 300 is now reset to 0. Sub-module 718 then resets (416) the AttackRecords register for all users and ends (418) the timer process. The embodiments are not limited in this context.

FIG. 5 illustrates one embodiment of a logic flow 500. Logic flow 500 may be representative of the operations executed by one or more protocols described herein that interface with module 700, authentication module 710, and sub-module 718, for example. Logic flow 500 illustrates one embodiment of a process in which a protocol service utilizes authentication module 710 within a computer 110-1a-n, 120-1a-m for example, to securely validate incoming information, such as, for example, requests from remote entity computers 130-1a-l, for example. Logic flow 500 may be executed by protocols in a variety of computing devices of system 100, although the embodiments are not limited in this context.

Accordingly, logic flow 500 illustrates various protocol services utilize authentication module 710 to validate incoming requests on a secure basis. A protocol calls authentication module 710 to validate information associated with newly established sessions. Once the initial session information is validated, the protocols cache the information within the context of the newly established session in order to perform positive validation of subsequent requests for the same session. For example, in the context of HTTPs a session may be defined by a unique TLS/SSL secure connection and each HTTP request message carries username password information (e.g., either HTTP Basic [RFC 2616] or HTTP Digest [RFC 2617]). As such, established connections may not be effected by any "blackout" period set by authentication module 710 and, therefore, established connections under "username(s)/password(s)" are not disconnected. In other words an attacker cannot utilize the mitigation mechanism according to the embodiments described herein to disconnect existing sessions. Only subsequent attacks may be subject to "blackout" periods.

The following logic flow 500 illustrates this request authentication process. A protocol calls (510) AuthenticateRequest function and passes information on as arguments, such as, for example, information that is representative of a new session, username, and password, among other information. The new information may be represented hereinafter as "new_session," "new_username," and "new_password," for example. The protocol determines (512) whether the session includes cached "username/password" information. If the session includes cached "username/password" information, the logic flow proceeds along "yes" branch and the protocol determines (514) whether the session cached "username/password" information authenticates the "new_username/new_password" pair. If the "new_username/new_password" pair is authenticated by the session cached "username/password," the logic flow proceeds along "yes" branch and the protocol sets (524) return status to "authorized." The protocol then caches (530) the "new_username/new_password" information and ends (538) the request authentication process for the session.

At decision block 514, if the "new_username/new_password" information is not authenticated by the session cached "username/password," the logic flow proceeds along "no" branch and the protocol determines (518) whether the SystemUnderAttack counter is greater than a predetermined threshold. If the SystemUnderAttack counter is greater than the predetermined threshold, the logic flow proceeds along "yes" branch and the protocol invokes (516) the "username" authentication process AuthenticateUser function at block 310 (FIG. 3) of logic flow 300 passing the "new_username" and "new_password" to authentication module 710, which then proceeds to execute logic flow 300 beginning at block 310. The protocol then determines (522) whether authentication module 710 successfully authenticated the "new_username/new_password." If authentication was successful, the logic flow proceeds along "yes" branch and the protocol sets (524) return status to "authorized." The protocol then caches (530) the "new_username/new_password" information in the session cache and ends (538) the authentication process. If authentication module 710 does not successfully authenticate the username/password, logic flow proceeds along "no" branch and the protocol sets (528) the return status to "server unavailable." Then, the protocol closes (534) the session and ends (538) the request authentication process for the session.

At decision block 518, if the SystemUnderAttack counter is not greater than a predetermined threshold, logic flow proceeds along "no" branch and the protocol again invokes (520) the protocol invokes (516) the "username" authentication process AuthenticateUser function at block 310 (FIG. 3) of logic flow 300 passing the "new_username" and "new_password" to authentication module 710, which then proceeds to execute logic flow 300 beginning at block 310. The protocol then determines (526) whether authentication module 710 successfully authenticated the "new_username/new_password." If authentication was successfully, logic flow proceeds along "yes" branch and the protocol sets (524) return status to "authorized." The protocol then caches (530) the "new_username/new_password" information in the session and ends (538) the request authentication process for the session. If the "new_username/new_password" are not successfully authenticated by authentication module 710, logic flow proceeds along "no" branch and the protocol removes (532) cached information from the current session. Then, the protocol sets (536) the return status to "server unauthorized" and ends (538) the request authentication process for the session. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method, comprising:
 receiving an initial authentication request comprising username and password information;
 determining whether said initial authentication request is valid based on said username and password information;
 incrementing a username-specific counter and a system counter when said initial authentication request is invalid;
 setting a first timer to a first time period based on said username-specific counter and said username information;

determining by a hardware processor whether to invalidate one or more subsequent authentication requests based on a first record associated with said username information;

invalidating only said one or more subsequent authentication requests with said username information during said first time period regardless of whether said subsequent request comprises valid password information;

setting a second time period for said system counter;

determining whether at least one of said initial or subsequent authorization requests was invalidated within the second time period; and resetting said system counter and said first record when no invalid authentication requests are received during said second time period.

2. The method of claim 1, comprising resetting said username-specific counter when at least one of said initial or subsequent authentication requests is valid.

3. An apparatus, comprising:
a hardware processor; and
a memory device coupled to said hardware processor, said memory device to store instructions that when executed on said hardware processor is operative to:
receive an initial authentication request comprising username and password information;
determine whether said initial authentication request is valid based on said username and password information;
increment a username-specific counter and a system counter when said initial authentication request is invalid;
set a first timer to a first time period based on said username-specific counter and said username information;
determine whether to invalidate one or more subsequent authentication requests based on a first record associated with said username information;
invalidate only said one or more subsequent authentication requests with said username information during said first time period regardless of whether said subsequent request comprises valid password information;
set a second time period for said system counter;
determine whether at least one of said initial or subsequent authorization requests was invalidated within the second time period; and
reset said system counter and said first record when no invalid authentication requests are received during said second time period.

4. The apparatus of claim 3, said instructions that when executed on said hardware processor are operative to reset said first counter when at least one of said initial or subsequent authentication requests is valid.

5. A system, comprising:
a hardware processor; and
a hardware communications medium interface coupled to said hardware processor, said hardware processor operative to:
receive an initial authentication request comprising username and password information;
determine whether said initial authentication request is valid based on said username and password information;
increment a username-specific counter and a system counter when said initial authentication request is invalid;
set a first timer to a first time period based on said username-specific counter and said username information;
determine whether to invalidate one or more subsequent authentication requests based on a first record associated with said username information;
invalidate only said one or more subsequent authentication requests with said username information during said first time period regardless of whether said subsequent request comprises valid password information;
set a second time period for said system counter;
determine whether at least one of said initial or subsequent authorization requests was invalidated within the second time period; and
reset said system counter and said first record when no invalid authentication requests are received during said second time period.

6. The system of claim 5, said hardware processor operative to record a number of all authentication requests carrying non-existing usernames information in a non-existent username counter.

7. The system of claim 6, said hardware processor operative is to reset said non-existent username counter when no invalid authorization requests are received during said second time period.

8. The system of claim 5, said hardware processor operative is to reset said username-specific counter when at least one of said initial or subsequent authentication requests is valid.

9. An article, comprising:
a memory device, said memory device including stored instructions that, when executed by a processor, are operable to:
receive an initial authentication request comprising username and password information;
determine whether said initial authentication request is valid based on said username and password information;
increment a username-specific counter and a system counter when said initial authentication request is invalid;
set a first timer to a first time period based on said username-specific counter and said username information;
determine whether to invalidate one or more subsequent authentication requests based on a first record associated with said username information;
invalidate only said one or more subsequent authentication requests with said username information during said first time period regardless of whether said subsequent request comprises valid password information;
set a second time period for said system counter;
determine whether at least one of said initial or subsequent authorization requests was invalidated within the second time period; and
reset said system counter and said first record when no invalid authentication requests are received during said second time period.

10. The article of claim 9, wherein the stored instructions when executed by a processor are further operable to reset said username-specific counter when at least one of said initial or subsequent authentication requests is valid.

* * * * *

UNITED STATES PATENT AND TRADEMARK OFFICE
CERTIFICATE OF CORRECTION

| | | |
|---|---|---|
| PATENT NO. | : 8,132,018 B2 | Page 1 of 1 |
| APPLICATION NO. | : 11/174126 | |
| DATED | : March 6, 2012 | |
| INVENTOR(S) | : Avigdor Eldar et al. | |

It is certified that error appears in the above-identified patent and that said Letters Patent is hereby corrected as shown below:

On sheet 2 of 5, in Figure 2, line 1, delete "200'" and insert -- 200 --, therefor.

On sheet 3 of 5, in Figure 3, line 1, above "Reference Numeral 310" insert -- 300 --.

On sheet 3 of 5, in Figure 3, Box. 324, line 1, delete "Conter" and insert -- Counter --, therefor.

On sheet 3 of 5, in Figure 3, Box. 318, line 3, delete "sucessful?" and insert -- successful? --, therefor.

On sheet 3 of 5, in Figure 3, Box. 326, line 2, delete "Conter" and insert -- Counter --, therefor.

On sheet 5 of 5, in Figure 5, Box. 528, line 3, delete "Unavaialable"" and insert -- Unavailable" --, therefor.

In column 16, line 24, in claim 7, before "to" delete "is".

In column 16, line 28, in claim 8, before "to" delete "is".

Signed and Sealed this
Twenty-ninth Day of May, 2012

David J. Kappos
*Director of the United States Patent and Trademark Office*